US008947385B2

(12) United States Patent
Ma et al.

(10) Patent No.: US 8,947,385 B2
(45) Date of Patent: Feb. 3, 2015

(54) METHOD AND DEVICE FOR INTERACTIVE STEREOSCOPIC DISPLAY

(75) Inventors: Jeong J Ma, Long Grove, IL (US); Hui Dai, Northbrook, IL (US); Timothy Dickinson, Crystal Lake, IL (US); John C Johnson, Spring Grove, IL (US); Seok-Hwan Kim, Seoul (KR); Phillip D Rasky, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 124 days.

(21) Appl. No.: 13/543,429

(22) Filed: Jul. 6, 2012

(65) Prior Publication Data

US 2014/0009402 A1 Jan. 9, 2014

(51) Int. Cl.
*G09G 5/00* (2006.01)

(52) U.S. Cl.
USPC ............ 345/173; 345/6; 345/178; 178/18.01; 178/18.09

(58) Field of Classification Search
USPC ................. 345/6, 156–178; 178/18.01, 18.09
See application file for complete search history.

(56) References Cited

U.S. PATENT DOCUMENTS

| | | | |
|---|---|---|---|
| 2007/0255139 A1 | 11/2007 | Deschinger et al. | |
| 2009/0002335 A1* | 1/2009 | Chaudhri | 345/173 |
| 2009/0217209 A1* | 8/2009 | Chen et al. | 715/856 |
| 2011/0246877 A1 | 10/2011 | Kwak et al. | |
| 2011/0291945 A1* | 12/2011 | Ewing et al. | 345/173 |
| 2011/0316679 A1 | 12/2011 | Pihlaja | |
| 2012/0050262 A1 | 3/2012 | Kim et al. | |
| 2012/0062549 A1 | 3/2012 | Woo et al. | |
| 2012/0081359 A1 | 4/2012 | Lee et al. | |
| 2012/0102436 A1 | 4/2012 | Nurmi | |
| 2012/0113018 A1 | 5/2012 | Yan | |
| 2012/0206484 A1* | 8/2012 | Hauschild et al. | 345/629 |
| 2012/0229450 A1 | 9/2012 | Kim et al. | |
| 2012/0262398 A1* | 10/2012 | Kim et al. | 345/173 |

FOREIGN PATENT DOCUMENTS

| | | |
|---|---|---|
| EP | 2400367 A2 | 12/2011 |
| EP | 2432236 A2 | 3/2012 |
| EP | 2453344 A1 | 5/2012 |

OTHER PUBLICATIONS

Patent Cooperation Treaty, "PCT Search Report and Written Opinion of the International Searching Authority" for International Application No. PCT/US2013/045540 dated Sep. 25, 2013, 13 pages.
Patent Cooperation Treaty, "PCT Search Report and Written Opinion of the International Searching Authority" for International Application No. PCT/US2013/045537 dated Sep. 30, 2013, 11 pages.
You Tube, "Unity 3D Object Rotation iPhone Test", Jul. 13, 2011, 1 page, http://www.youtube.com/watch?v=w6dYzWaP3M8.
You Tube, "AutoCAD 3D Modelling—Positioning Objects", Dec. 13, 2009, 1 page, http://www.youtube.com/watch?v=1riUJZE_Vz0.
You Tube, "MayaWorkshop2: Creating and Moving 3D Objects (maya animation training)", May 11, 2010, 1 page, http://www.youtube.com/watch?v=SxHIht5ZBpl.

* cited by examiner

*Primary Examiner* — Jennifer Nguyen
(74) *Attorney, Agent, or Firm* — Troutman Sanders LLP; James E. Schutz; Mark Lehi Jones

(57) ABSTRACT

Disclosed is a method of interactive display that includes providing a touch-based display screen capable of stereoscopic displaying of object images that further includes displaying a plurality of object images on the display screen, wherein at least a first of the object images is selectable and displayed so as to appear to be located at least partially in a zero-plane of the display screen, wherein at least a second of the object images is displayed so as to appear to be located at least one of inwardly and outwardly of the zero-plane, receiving a first input at a location of the display screen substantially corresponding to the first of the object images, and identifying the first input as corresponding to the first of the object images that is selectable and taking at least one further action upon the identification.

19 Claims, 11 Drawing Sheets

METHOD AND DEVICE FOR INTERACTIVE STEREOSCOPIC DISPLAY

FIELD OF THE INVENTION

The method and system encompassed herein is related generally to the interactive display of images on a device display and, more particularly, to the interactive display of object images in a stereoscopic manner.

BACKGROUND OF THE INVENTION

As technology has progressed, various devices have been configured to display images, and particularly objects in those images, in a manner by which users perceiving those object images perceive the object images to be three-dimensional (3D) object images even though the images are displayed from two-dimensional (2D) display screens. Such manner of display is often referred to as stereoscopic or three-dimensional imaging. Stereoscopic imaging is a depth illusion created by displaying a pair of offset images separately to right and left eyes of a viewer, wherein the brain combines the images to provide the illusion of depth. Device users are generally accustomed to manipulating various 2D object images on 2D display screens using a pointing device, such as a finger, although the manipulation of perceived 3D object images displayed on 2D screens via stereoscopic imaging creates various spatial issues for a user. For example, selecting a perceived 3D object image on a 2D screen can be counterintuitive to a user who is provided with only the screen surface to touch. If an object image appears closer to the user than the screen or farther away from the user than the screen, the user naturally attempts to touch a space in front of the display or behind it, creating an undesirable and potentially frustrating experience for the user.

BRIEF SUMMARY

The above considerations, and others, are addressed by the method and system encompassed herein, which can be understood by referring to the specification, drawings, and claims. According to aspects of the method and system encompassed herein, a method of interactive display is provided that includes providing a touch-based display screen capable of stereoscopic displaying of object images, displaying a plurality of object images on the display screen, wherein at least a first of the object images is selectable and displayed so as to appear to be located at least partially in a zero-plane of the display screen, wherein at least a second of the object images is displayed so as to appear to be located at least one of inwardly and outwardly of the zero-plane. The method further includes receiving a first input at a location of the display screen substantially corresponding to the first of the object images, and identifying the first input as corresponding to the first of the object images that is selectable and taking at least one further action upon the identification.

According to further aspects, a method of interactive display is provided that includes displaying a plurality of object images on a touch sensitive stereoscopic display screen of a mobile device, wherein the plurality of object images are arranged into at least a first object group and a second object group, and displaying the first object group and second object group as a first object stack and a second object stack situated substantially side by side, wherein a first object image of the plurality of object images is displayed on the first object stack as a first top object with a first object front face exposed, and wherein the first top object is positioned to appear at least partially at a zero-plane, and wherein a second object image of the plurality of object images is displayed on the second object stack as a second top object with a second object front face exposed, and wherein the second top object is positioned to appear at least partially at a zero-plane. The method further including selecting one of the first top object and the second top object and modifying the displaying of the first object stack and second object stack to position the selected top object at least partially at the zero-plane, and modifying the displaying of the unselected top object to position the unselected top object inward of the zero-plane.

According to still further aspects, a mobile device is provided that includes a touch sensitive display screen capable of providing a stereoscopic view, wherein the stereoscopic view includes an image displayed on the display screen that includes a plurality of object images, and wherein the object images appear to a user viewing the display screen to be situated in a three-dimensional virtual space that includes an X axis, Y axis, and Z axis with the virtual space being intersected by a zero-plane located at the surface of the display screen. The mobile device further includes a processor portion that is programmed to control the displaying of the object images on the display screen, wherein at least one of the object images is displayed so as to appear at least partly coincident with the zero-plane, such that it is selectable by a user for performing a function, and at least one of the other object images is positioned at least one of inward and outward of the zero-plane and is not selectable to perform a function, and wherein selection by a user shifts the at least one of the object images that is selectable out of the zero-plane.

BRIEF DESCRIPTION OF THE SEVERAL VIEWS OF THE DRAWINGS

While the appended claims set forth the features of the method and system encompassed herein with particularity, the method and system encompassed herein, together with its objects and advantages, may be best understood from the following detailed description taken in conjunction with the accompanying drawings of which:

DETAILED DESCRIPTION

Figure 1:
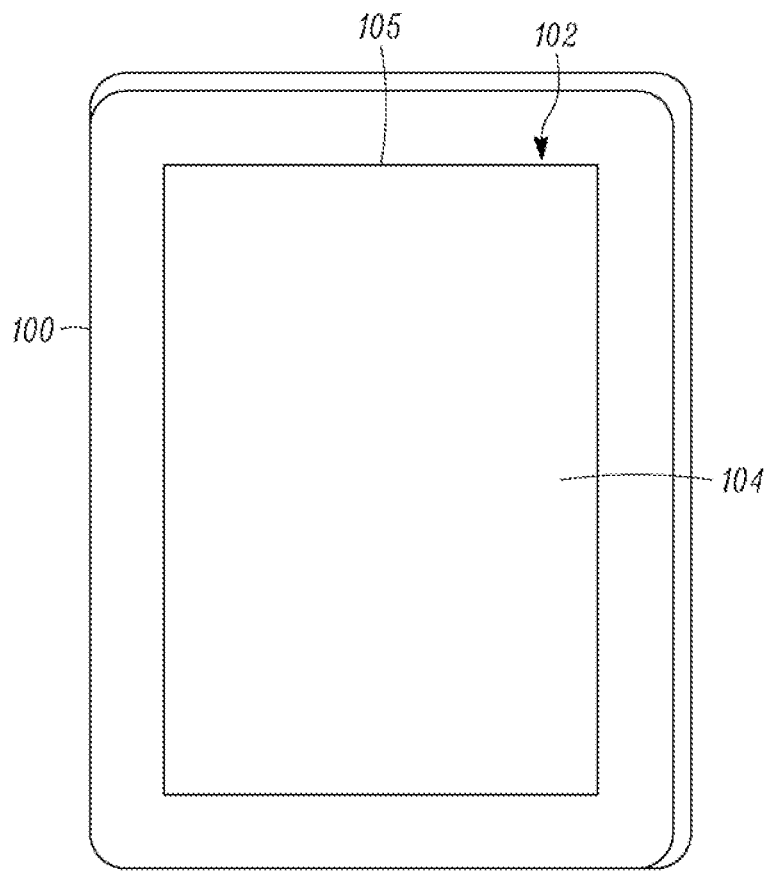
FIG. 1 depicts an example mobile device.

Turning to the drawings, wherein like reference numerals refer to like elements, the method and system encompassed herein is illustrated as being implemented in a suitable environment. The following description is based on embodiments of the method and system encompassed herein and should not be taken as limiting the method and system encompassed herein with regard to alternative embodiments that are not explicitly described herein.

As will be described in greater detail below, it would be desirable if an arrangement of multiple object images with respect to which user interaction is desired could be displayed on a mobile device in a stereoscopic manner that, in at least some embodiments, not only made it clear that multiple object images were present but also made it clear which one of the multiple object images was the one with respect to which a user should particularly interact. It particularly would be advantageous, in at least some embodiments, to avoid interactions with the mobile device in which attempted touches fail to provide the desired result (e.g., because a user fails to actually touch the display screen because an object for selection appears to be in front of the screen) or attempted touches result in unexpected abrupt bumping of the touch screen (e.g., because a user perceives an object image for selection to appear behind the screen). The display and manipulation of such object images in a stereoscopic environment can be presented in numerous forms. In at least some embodiments, the object images are displayed and manipulated on a mobile device, such as a smart phone, a tablet, or a laptop computer. In other embodiments, they can be displayed and manipulated on other devices, such as a desktop computer. The manipulation is accomplished, in at least some embodiments, using a touch sensitive display, such that a user can manipulate the object images with a simple touch, although other types of pointing and selecting devices, such as a mouse, trackball, stylus, pen, etc., can be utilized in addition to or in place of user-based touching.

FIG. 1 depicts an example mobile device 100. The mobile device 100 can include, in at least some embodiments, a smart phone (e.g., RAZR MAXX, etc.), a tablet (e.g., Xoom™, etc.), or a laptop computer. In other embodiments, the mobile device 100 can include other devices, such as a non-mobile device, for example, a desktop computer that includes a touch-based display screen or a mechanical input device, such as a mouse. Although various aspects described herein are referenced to a touch-based display screen, it is to be understood that selection of an object image can include human and/or mechanical device touching/selection.

The mobile device 100 in the present embodiment includes a display screen 102 having a touch-based input surface 104 (e.g., touch sensitive surface or touch panel) situated on the exposed side of the display screen 102, which is accessible to a user. For convenience, references herein to selecting an object at the display screen 102 should be understood to include selection at the touch-based input surface 104. The display screen 102 is in at least some embodiments planar, and establishes a physical plane 105 situated between the exterior and interior of the mobile device 100. In other embodiments, the display screen 102 can include curved portions, and therefore, the physical plane 105 can be non-planar. The display screen 102 can utilize any of a variety of technologies, such as, for example, specific touch sensitive elements. In the present embodiment, the display screen 102 is particularly configured for the stereoscopic presentation of object images (as discussed below). More particularly, the display screen 102 can include an LCD that uses a parallax barrier system to display 3D images, such as manufactured by Sharp Electronics Corp. in New Jersey, USA. The parallax barrier has a series of vertical slits to control the path of light reaching the right and left eyes, thus creating a sense of depth. The part is a whole screen with the regular LCD and a barrier layer sandwiched in between touch and LCD glasses. The display screen 102 displays information output by the mobile device 100, while the input surface 104 allows a user of the mobile device 100, among other things, to select various displayed object images and to manipulate them. The mobile device 100, depending upon the embodiment, can include any of a variety of software configurations, such as an interface application that is configured to allow a user to manipulate the display of media stored on or otherwise accessible by the mobile device 100.

Figure 2:
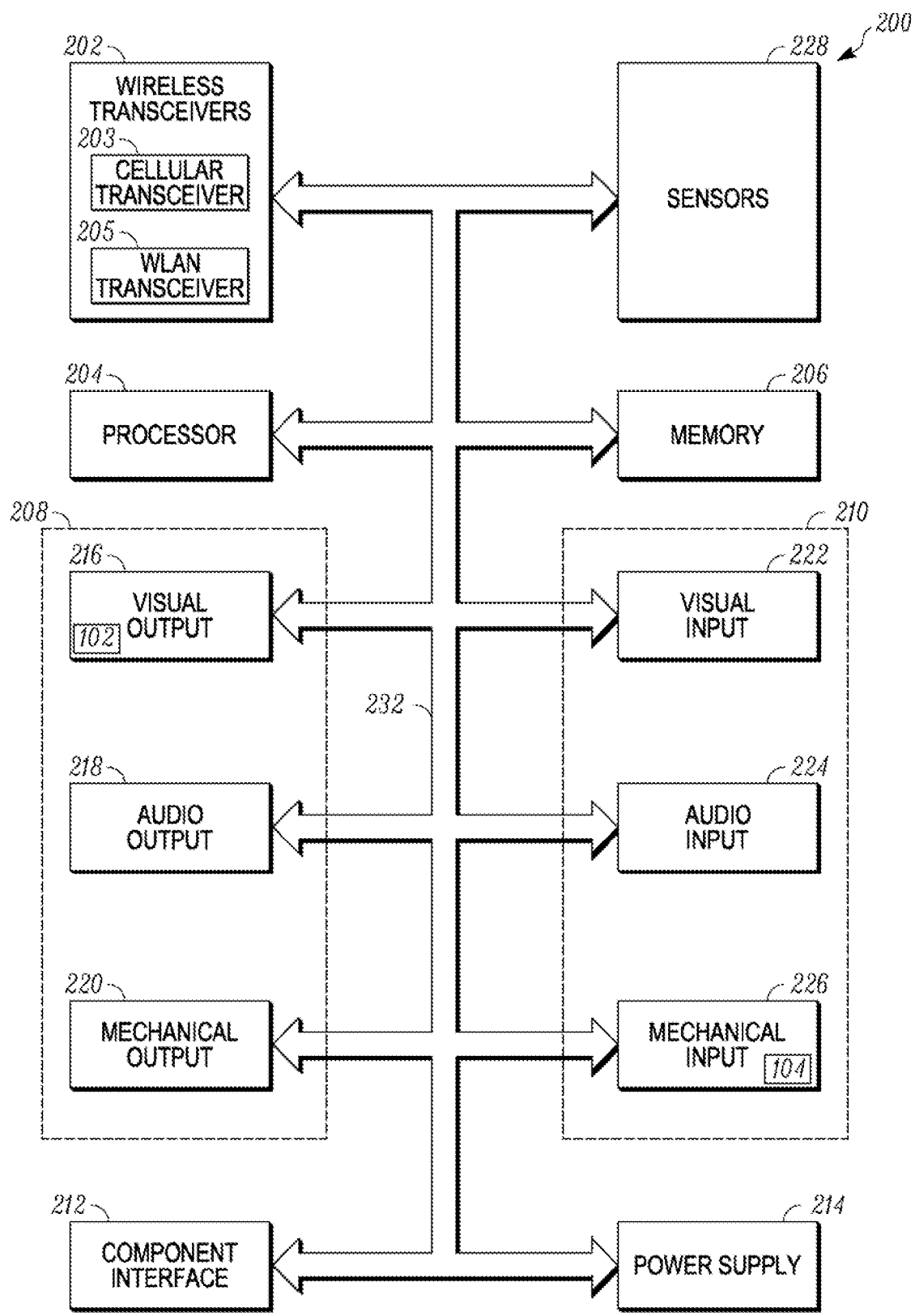
FIG. 2 depicts an example block diagram showing example internal hardware components of the mobile device of FIG. 1.

FIG. 2 is a block diagram illustrating example internal components 200 of the mobile device 100. As shown in FIG. 2, the components 200 of the mobile device 100 include multiple wireless transceivers 202, a processor portion 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208, and one or more of the input devices 210. Such is the case with the present embodiment, in which the display screen 102 includes both output and input devices. The internal components 200 can further include a component interface 212 to provide a direct connection to auxiliary components or accessories for additional or enhanced functionality. The internal components 200 can also include a power supply 214, such as a battery, for providing power to the other internal components while enabling the mobile device 100 to be portable. Further, the internal components 200 can additionally include one or more sensors 228. All of the internal components 200 can be coupled to one another, and in communication with one another, by way of one or more internal communication links 232 (e.g., an internal bus).

Further, in the present embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Thus, although in the present embodiment the mobile device 100 has two of the wireless transceivers 203 and 205, the present disclosure is intended to encompass numerous embodiments in which any arbitrary number of wireless transceivers employing any arbitrary number of communication technologies are present.

Example operation of the wireless transceivers 202 in conjunction with others of the internal components 200 of the mobile device 100 can take a variety of forms and can include, for example, operation in which, upon reception of wireless signals, the internal components detect communication signals and the transceivers 202 demodulate the communication signals to recover incoming information, such as voice and/or data, transmitted by the wireless signals. After receiving the incoming information from the transceivers 202, the processor portion 204 formats the incoming information for the one or more output devices 208. Likewise, for transmission of wireless signals, the processor portion 204 formats outgoing information, which can but need not be activated by the input devices 210, and conveys the outgoing information to one or more of the wireless transceivers 202 for modulation so as to provide modulated communication signals to be transmitted. The wireless transceiver(s) 202 conveys the modulated communication signals by way of wireless (as well as possibly wired) communication links to other devices.

Depending upon the embodiment, the output devices 208 of the internal components 200 can include a variety of visual, audio and/or mechanical outputs. For example, the output device(s) 208 can include one or more visual output devices 216, such as the display screen 102 (e.g., a liquid crystal display and/or light emitting diode indicator(s)), one or more audio output devices 218 such as a speaker, alarm and/or buzzer, and/or one or more mechanical output devices 220 such as a vibrating mechanism. Likewise, the input devices 210 of the internal components 200 can include a variety of visual, audio and/or mechanical inputs. By example, the input device(s) 210 can include one or more visual input devices 222 such as an optical sensor (for example, a camera lens and photosensor), one or more audio input devices 224 such as a microphone, and one or more mechanical input devices 226 such as a flip sensor, keyboard, keypad, selection button, navigation cluster, input surface (e.g., touch sensitive surface associated with one or more capacitive sensors), motion sensor, and switch. Operations that can actuate one or more of the input devices 210 can include not only the physical pressing/actuation of buttons or other actuators, and physically touching or gesturing along touch sensitive surfaces, but can also include, for example, opening the mobile device 100 (if it can take on open or closed positions), unlocking the mobile device 100, moving the mobile device 100 to actuate a motion, moving the mobile device 100 to actuate a location positioning system, and operating the mobile device 100.

As mentioned above, the internal components 200 also can include one or more of various types of sensors 228. The sensors 228 can include, for example, proximity sensors (e.g., a light detecting sensor, an ultrasound transceiver or an infrared transceiver), touch sensors (e.g., capacitive sensors associated with the input surface 104 that overlays the display screen 102 of the mobile device 100), altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 100. While the sensors 228 are for the purposes of FIG. 2 considered as distinct from the input devices 210, various sensors 228 (e.g., touch sensors) can serve as input devices 210, and vice-versa. Additionally, while in the present embodiment the input devices 210 are shown to be distinct from the output devices 208, it should be recognized that in some embodiments one or more devices serve both as input device(s) and output device(s). In the present embodiment in which the display screen 102 is employed, the touch screen display can be considered to constitute both one of the visual output devices 216 and one of the mechanical input devices 226.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor portion 204 in a single device (e.g., a processing device including memory or processor-in-memory (PIM)), albeit such a single device will still typically have distinct portions/sections that perform the different processing and memory functions and that can be considered separate devices. The data that is stored by the memory portion 206 can include, but need not be limited to, operating systems, applications, and informational data.

Each operating system includes executable code that controls basic functions of the mobile device 100, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality, such as file system service and handling of protected and unprotected data stored in the memory portion 206. Such operating system and/or application information can include software update information (which can be understood to potentially encompass update(s) to either application(s) or operating system(s) or both). As for informational data, this is non-executable code or information that can be referenced and/or manipulated by an operating system or application for performing functions of the mobile device 100.

Figure 3:
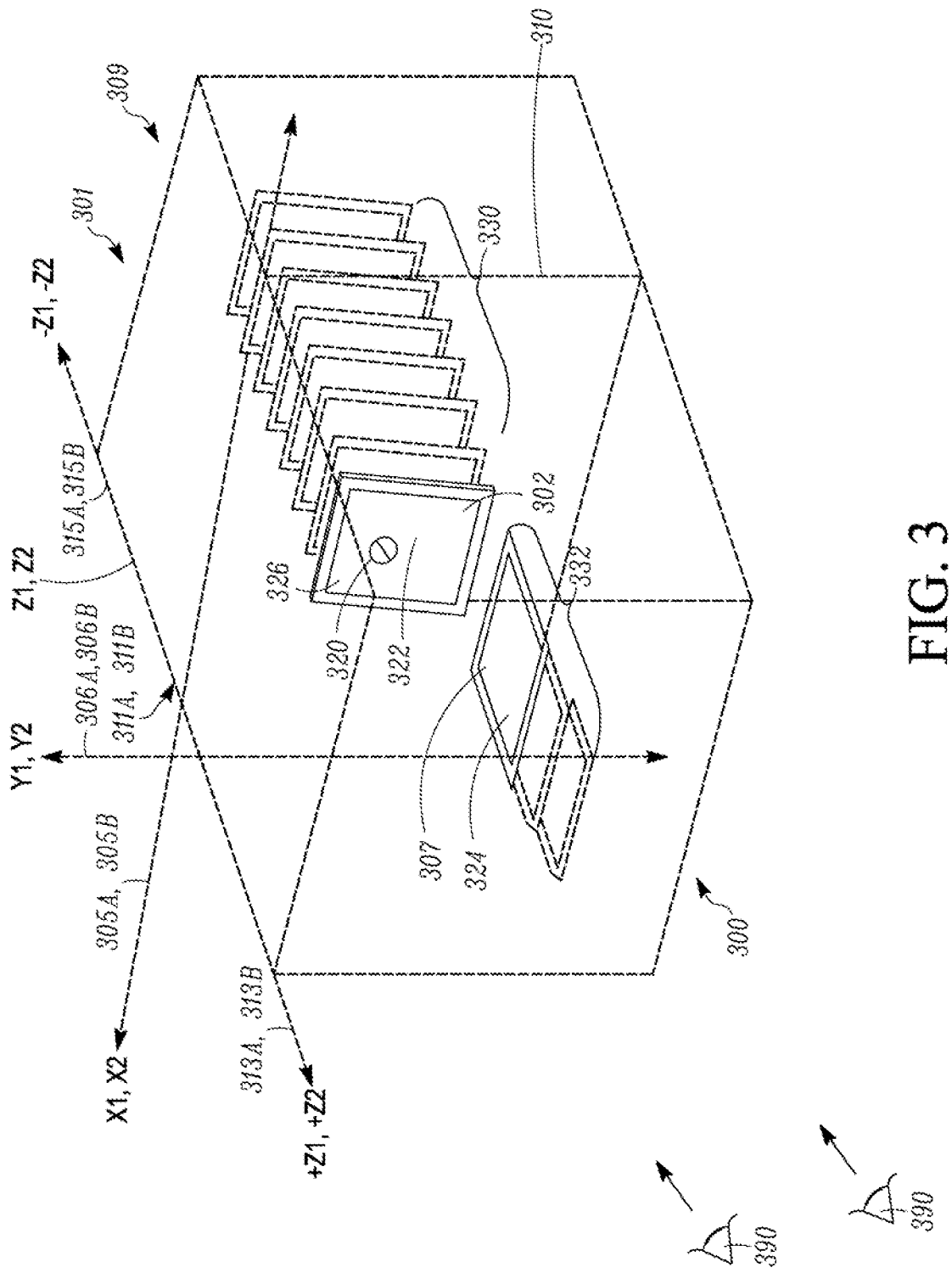
FIG. 3 depicts an example schematic diagram that illustrates a virtual space that includes an example stereoscopic display of example object images arranged in relation to X, Y, and Z axis of the virtual space.

FIG. 3 depicts a virtual space 300 that is intended to illustrate a world coordinate system 301 and a camera coordinate system 309, which are utilized to provide an example stereoscopic view (user perceived three-dimensional (3D) view) of object images 302 relative to the display screen 102 of the mobile device 100. The object images 302 can be representative of various objects, such as picture files, music files, video files, widgets, documents, etc., which are stored on or otherwise accessible by the mobile device 100, and in some embodiments, can be considered to be among the informational data stored in the memory portion 106. In the Figures, the object images 302 are illustrated as card frame images (e.g., in the form of a framed picture), although in other embodiments the object images 302 can be shaped and sized to resemble other objects or provide unique objects.

As will be discussed with reference to additional Figures, the object images 302 can be manipulated on the display screen 102 to reorient the object images 302 relative to each other (movement in the world coordinate system 301) and to reorient the object images 302 relative a physical plane 105 of the display screen 102 (movement in the camera coordinate system 309). The manipulations are generally initiated by a user 416 (FIG. 4) performing a gesture on the display screen 102, such as touching the display screen 102 with one or more fingers at the point on the display screen 102 where the object image 302 appears. However, in at least some embodiments, the manipulations can be performed through other input methods, such as through the use of a mechanical pointing device, voice commands, etc.

In the present embodiments, the mobile device 100 is programmed to display an arrangement of object images 302 in a stereoscopic view. For the purposes of the display, it is assumed that the arrangement of object images 302 is occurring within the virtual space 300. The world coordinate system is defined by an X1 axis 305A, a Y1 axis 306A, and a Z1 axis 311A. The camera coordinate system is defined by an X2 axis 305B, a Y2 axis 306B, and a Z2 axis 311B. The coordinates in the world coordinate system 301 are based on coordinates established about the earth, such as the North and South Poles, sea level, etc. Each object image 302 has a specific world coordinate position. If the position of only one object image 302 is modified by a user, its world coordinate system position is changed with respect to the other non-moved object images 302. In contrast, the coordinates in the camera coordinate system 309 are based on the view of the object images 302 as a group on the display screen 102, as seen by a user's eyes 390. The user 416 can move the object images 302 as a group about the camera coordinate system 309 to provide a different view of the object images 302 on the display screen 102, although the coordinates of the object images 302 in the world coordinate system 301 can remain static during this movement.

The object images 302 are particularly arranged in the virtual space 300 so that one or more object images 302, such as (in this example) a selectable object image 326, with respect to which user interaction is intended, is/are displayed so as to coincide with the physical plane 105 of the display screen 102, were the physical plane is coincident with a zero-plane 310 that resides in the X2-Y2 plane (formed by the X2 axis 305B and Y2 axis 306B) of the camera coordinate system 309 of the virtual space 300. In contrast, the object images 302 that are not intended to be generally selectable by a user are displayed to the user 416 in a manner that they appear either in front of or behind the physical plane 105 of the display screen 102, and not at the zero-plane 310. When an object image 302 is positioned at the zero-plane 310 (coincident with the display screen 102), it can be visibly distinguished in any of a variety of manners. For example, by providing coloring/cross-hatching/detail/opacity on the object image 302 to indicate that it is positioned for selection, or by providing other contextual information, that suggests to the user that the object image 302 is appropriate for selection. Positioning the selectable object image 326 at the zero-plane 310 provides an intuitive selection point for the user 416.

Figure 4:
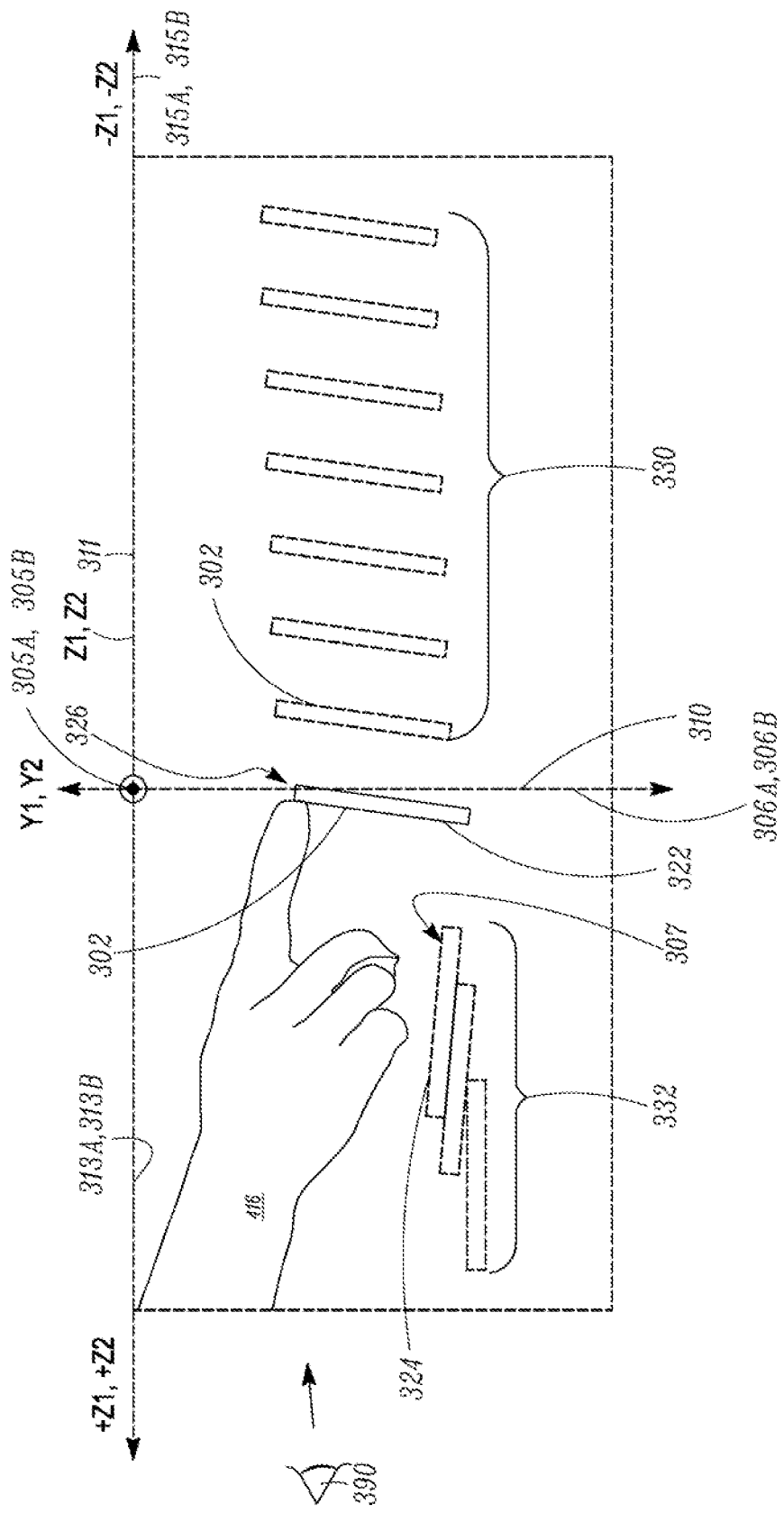
FIG. 4 depicts an example cross-sectional view of FIG. 3 taken along a Y-Z plane defined by the Y and Z axis of FIG. 3, as viewed along the X axis.

Referring to FIGS. 3 and 4, in at least some embodiments, the axes of the world coordinate system 301 can coincide with the axes of the camera coordinate system 309. In such a configuration, the object image 302 that is desired to be selectable by the user (selectable object image(s) 326) can be moved in either the world coordinate system 301 or the camera coordinate system 309 to appear at least partially in the zero-plane 310, which is coincident with the X2-Y2 plane in the virtual space 300. By placing the selectable object 326 to appear at the zero-plane 310 (the physical plane 105), the chance of a user having an unexpected interaction with the display screen 102 can be reduced.

As seen in FIGS. 3 and 4, the Z1 and Z2 axes 311A, 311B can extend perpendicular to the X1-Y1 and X2-Y2 planes, respectively. The Z2 axis 311B further includes a +Z2 axis portion 313B and a −Z2 axis portion 315B. Portions of the selectable object 326, as well as object images 302 that are not selectable, can extend along either the +Z2 axis portion 313B or the −Z2 axis portion 315B and be displayed so as to provide the appearance that they are situated either inward of (behind) the display screen 102 or outward (in front) of the display screen 102. More particularly, object images 302 that are displayed to appear along the +Z1 axis portion 313A are shown as progressively extending outward of the display screen 102 (towards the user). In contrast, the object images 302 positioned along the −Z2 axis portion 315B can be shown as progressively extending inward of the display screen 102 (away from the user). In the present embodiment, the display of the object images 302 as at, behind, or in front of the display screen 102 is accomplished using stereoscopic imaging. For later reference, the Z1 axis 311A further includes a +Z1 axis portion 313A and a −Z1 axis portion 315A.

By virtue of this manner of display of the selectable object image 326, a user intuitively attempts to select, by touching of the display screen 102, only one or more object images 302 that are (i) displayed in a manner that is assumed by the system to be corresponding to a location in virtual space 300 that is coincident with the position of the display screen 102 and physical plane 105 (zero-plane 310) in real space, and (ii) displayed in a manner that suggests to the user that the object images 302 are actually at or close to the physical position of the display screen 102 and physical plane 105. As a consequence, a user avoids attempting to touch object images 302 that appear to be in front of or behind the display screen 102, and consequently the undesired behavior described above can be avoided.

As best seen in FIG. 4, which is a cross-sectional view of the virtual space 300 of FIG. 3 taken at the Y-Z plane, the object images 302 that are not selectable are positioned along the +Z2 axis portion 313B and −Z2 axis portion 315B. To provide some assistance to the user, as already noted, the selectable objects 326 can have a different appearance than those of the object images 302 that are not selectable. For example, the object images 302 that are not selectable can be shown as translucent to indicate to a user that they are not selectable, whereas the selectable objects 326 that are in the zero-plane 310 can be opaque to provide easy identification to the user that they are available for selection. As object images 302 manipulated by the user can move in and out of positions along the +Z2 axis portion 313B, −Z2 axis portion 315B, and zero-plane 310, their opacity can change to provide proper identification of their selectability status. This is illustrated in FIG. 4 by showing the selectable object image 326 with solid lines and the other objects 302 by dashed lines, although the use of dashed and solid lines is only intended to be representative of a variety of techniques for displaying different ones of the objects so as to distinguish selectable object images from non-selectable ones. In at least some embodiments, some of the object images 302, such as a folded-down object 307 (as discussed below), can be selectable even though it is positioned to appear at least partially in front of the zero-plane 310. Such an accommodation can minimize the actions required by the user 416 to select adjacent object images 302.

As noted above, the object images 302 can appear in various forms. The stereoscopic effect provided by the shape of the object image 302 can be enhanced by displaying the object image 302 with a thickness, rounded corners, and beveled edges, although other shapes that provides spatial depth can also be utilized. In the present embodiment, each object image 302 can include a graphical representation 320 displayed on an object front face 322 to provide unique identification. Additionally, an object rear face 324 is provided on each object image 302. In at least some embodiments, the graphical representation 320 can include an image of the particular media that is provided in the actual file it is intended to represent. For example, if the object image 302 represents a photograph, then the graphical representation 320 can include all or least a portion of the actual photograph image. In other embodiments, the graphical representation 320 can include an unrelated or generic image or text identifier. As discussed below, in the present embodiment, whether the object front face 322 or object rear face 324 is visible to the user 416 depends upon the location of the object image 302 in the virtual space 300 and the user view chosen.

The object images 302 can be displayed in various positions depending upon whether the object images 302 are in front of or behind the selectable object image 326. In the present embodiment, the unselected object images 330 appear behind the selectable object image 326 and are displayed with a similar upright position as the selectable object 326 with the graphical representation 320 of the unselected object images 330 being at least partially displayed to a user 416. The object images 302 that are not intended to be selectable by the user 416 are generally displayed to appear as positioned in the camera coordinate system 309 along either the +Z2 axis portion 313B or −Z2 axis portion 315B. More particularly, as shown in FIGS. 3 and 4, a group of unselectable object images 330 are shown along the −Z2 axis portion 315B so as to be perceived to the user's eyes 390 as farther from the user 416 (when viewed from a line of sight perpendicular to the zero-plane 310), while a series of previously selected object images 332 are shown along the +Z2 axis portion 313B so as to be perceived as closer to the user's eyes 390. In the present embodiment, the object images 302 can be manipulated by a gesture performed by the user 416. For example, the selectable object 326 can be moved by the user 416 (e.g., tipped, swiped, flicked) in a downward motion to reveal the object front face 322 of the object image 302 positioned behind the selectable object 326, thereby shifting the subsequently revealed and previously unselectable object image 302 to the zero-plane 310 and establishing it as the selectable object 326. The previously selected object images 332 can be displayed to provide an indication that they have been previously selected (as discussed further below), for example, they can be displayed in a folded down position relative to the selectable objects 326. For reference, the most recent selectable object 326 that has been folded down by the user 416 is at times referenced herein as a folded-down object 307.

When the previously selected objects 332 are displayed folded down, the previously selected objects 332 display their object rear faces 324 to the user 416, with the graphical representation 320 not being displayed. In at least some embodiments, the object rear faces 324 can include the same or a different graphical representation 320 as displayed on the object front face 322. Further, the object rear faces 324 can include text details of the object that it represents or can be blank. In at least some embodiments, the object images 302 can be displayed as two-dimensional (2D) in some views on the display screen 102, while in other views the object images 302 can be displayed in a stereoscopic view. Further, in at least some embodiments, the folded-down object 307 can be configured to be selectable, as discussed above. The configuration of the various object images 302 as discussed above with reference to the virtual space 300 can be utilized in various manners to provide an interactive stereoscopic display on the mobile device 100.

The axes of the world coordinate system 301 and camera coordinate system 309, as well as the zero-plane 310 of the virtual space 300, as shown in FIGS. 3 and 4, provide a reference framework that is intended to be illustrative of a similar example framework for the remaining FIGS. 5-12, which include like named element numbers. In general, like named elements (e.g., object image 302, object image 502) are intended to be similar elements, but can be shown in different views.

Displaying the object images 302 in the virtual space 300 can provide a stereoscopic appearance to a user. More particularly, the stereoscopic appearance of the object images 302 in front of, at, or behind the display screen 102 can be provided by displaying a pair of identical images to represent each object image 302, so that the left eye of the user sees one and the right eye sees the other. In this regard, even though the user is provided with a display of multiple identical images, they will only recognize a single image representative of a single object image 302. Further, the distance between images used in each pair to represent a single object image 302 can be varied to create the appearance of an object image 302 being positioned closer or farther from the zero-plane 310. The closer the images are to each other, the farther they appear to be positioned from the user viewing the display screen 102. For example, if the identical images in a pair are substantially overlapped, they will appear to be far from the user. In contrast, the farther apart the identical images are from each other, the closer they appear to the user. Due to the detailed nature of the Figures, for clarity, the aforementioned method of displaying identical pairs of images for each object image 302 has not been illustrated herein. However, it is to be understood that this method, along with other methods of providing a stereoscopic appearance, can be utilized in one or more of the embodiments described herein.

Figure 5:
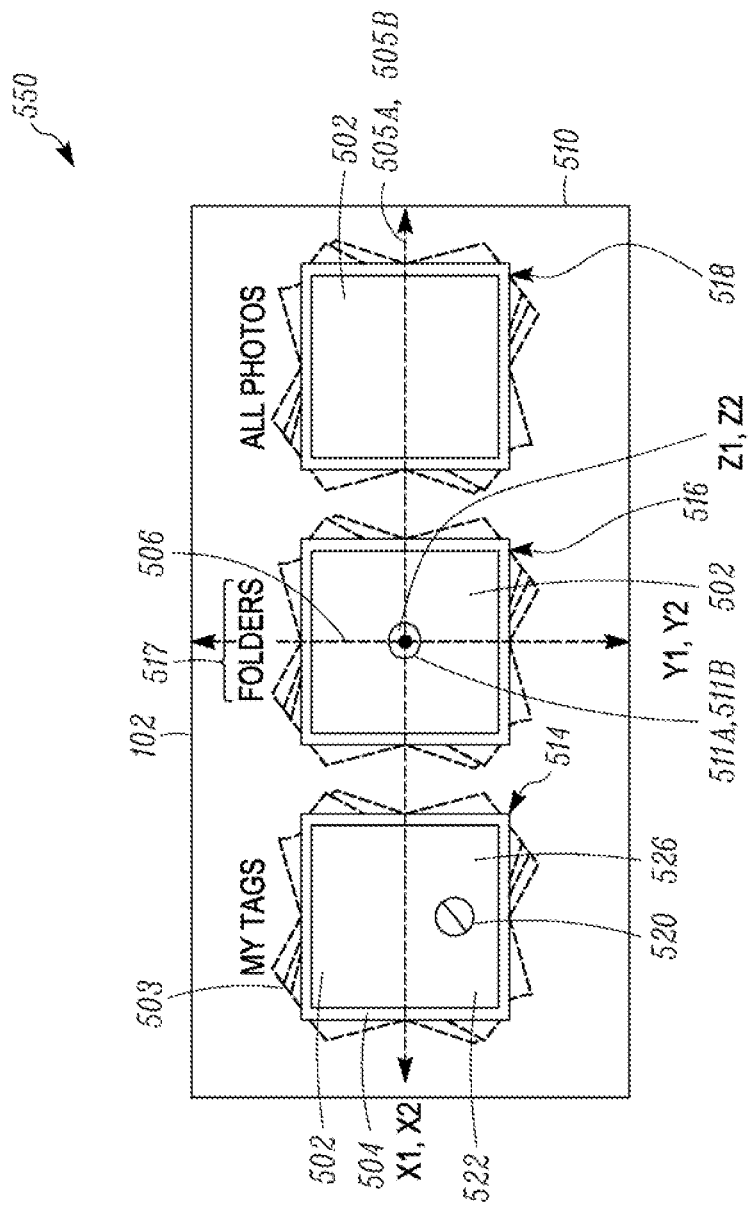
FIG. 5 depicts an example folder view illustrating example object images in object stacks.

Referring now to FIG. 5, a plurality of object images 502 is situated in a virtual space 500 arranged for viewing on the display screen 102. The virtual space 500 includes a world coordinate system 501 and camera coordinate system 509. The object images are shown arranged in the world coordinate system 501 along an X1 axis 505A, a Y1 axis 506A, and a Z1 axis 511A. In addition, the object images 502 are positioned in the camera coordinate system 509 along an X2 axis 505B, a Y2 axis 506B, and a Z2 axis 511B. In addition, the camera coordinate system 509 includes a zero-plane 510 situated in the X2-Y2 plane. In the embodiment shown in FIG. 5, the world coordinate system 501 is coincident with the camera coordinate system 509, and a zero-plane 510. FIG. 5 depicts a view of the display screen 102 as seen by a user's eyes 490 looking towards the display screen 102 in the direction of the Z axis 311.

The object groups 503 can be displayed initially as object stacks 504 (although in some other views they are positioned differently). In this regard, a plurality of object stacks 504 can be displayed across the display screen 102, providing the user with an aesthetic view with various options for intuitive interaction. For reference purposes, the object stacks 504 have been identified as object group-A 514, object group-B 516, and object group-C 518. Each object stack 504 can display a top object 508, which can include an associated graphical representation 520 displayed on an object front face 522 and/or adjacent text 517 providing identification for the specific object group 503. As the top (frontmost) object 508 of each object stack 504 is configured to be selectable, at least a portion of the top object 508 is displayed to appear at the zero-plane 510, located at the display screen 102, as discussed above.

Further, referring to FIG. 5, in at least some embodiments, each object group 503 can be representative of a file folder (e.g., data saved on or accessible by the mobile device 100) that contains various object images 502, wherein the selection of a particular object group 503 generates a refreshed display view displaying the object images 502 located in that particular file folder. For example, selecting an object stack 504 that includes an "All Photos" group, such as object group 518, would result in an updated display screen view that includes all the photographs stored on the mobile device 100. FIG. 5 is referenced generally as a folder view 550, wherein the total number of object stacks 504 displayed can vary depending on the number of folders available to the mobile device 100, as well as the display and font size. The total number of object stacks can be less or more than shown in the Figures. A user (such as user 416) can make a selection on the mobile device 100 to change a present view of the object images 502 on the display screen 102. The selection can be made in various manners, for example, by touching the display screen 102 above the top object 508. If an object stack 504 is selected, then a new view can be generated by the processor 204, such as the browsing folder view 650 (FIG. 6).

In the browsing folder view 650, the object groups 514, 516, 518 remain visible as object stacks 504, although the illusionary stereoscopic appearance is enhanced by angling and aligning the object images 502 in the object stacks 504. In this configuration, the selectable objects 526 include the top object 508 in object group-A 514, a top object 606 in object group-B 516, and a top object 608 in object group-C 518. Each top object 508, 606, 608 is positioned along the X1 axis 505A in the world coordinate system 501, although in other embodiments, the top objects 508, 606, 608 can be positioned otherwise. The remaining object images 502 for each object group 514, 516, 518 are displayed as being progressively situated along a −Z1 axis 515A, so that they appear further inward of the display screen 102 to enhance the stereoscopic effect. Rotation of the object images 502 within the camera coordinate system 509 can change which top object 508, 606, 608 is available for selection by placing the top object(s) 508, 606, 608 at the zero-plane 510. Likewise, modification of the object images 502 in the world coordinate system 301 can change which top object 508, 606, 608 is available for selection by placing the top object(s) 508, 606, 608 at the zero-plane 510.

In addition to object groups 514, 516, 518, additional object groups can be provided and positioned adjacent to the object groups 514, 516, 518. Such object groups can also be shifted into the zero-plane 510 for selection by the user 416. A gesture, such as a finger swipe to the left or right, can shift all of the object stacks 504 in the respective direction along the X axis 505, for example. In at least one embodiment, a swipe gesture to the left can move each of the object groups 514, 516, 518 to the left, placing the object group-B 516 into the prior position of object group-A 514, for example. Similarly, a swipe gesture to the right can move the object groups 514, 516, 518 to the right, placing an object group (not shown) into the prior position of object group-A 514 and shift object group-B 516 out of view. In addition, to enhance identification of the selectable objects 526 (which again are generally the top objects 508, 606, 608), the top object images 508, 606, 608 of each object group 514, 516, and 518 can include a graphical representation 520 shown on their object front face 522.

Figure 6:
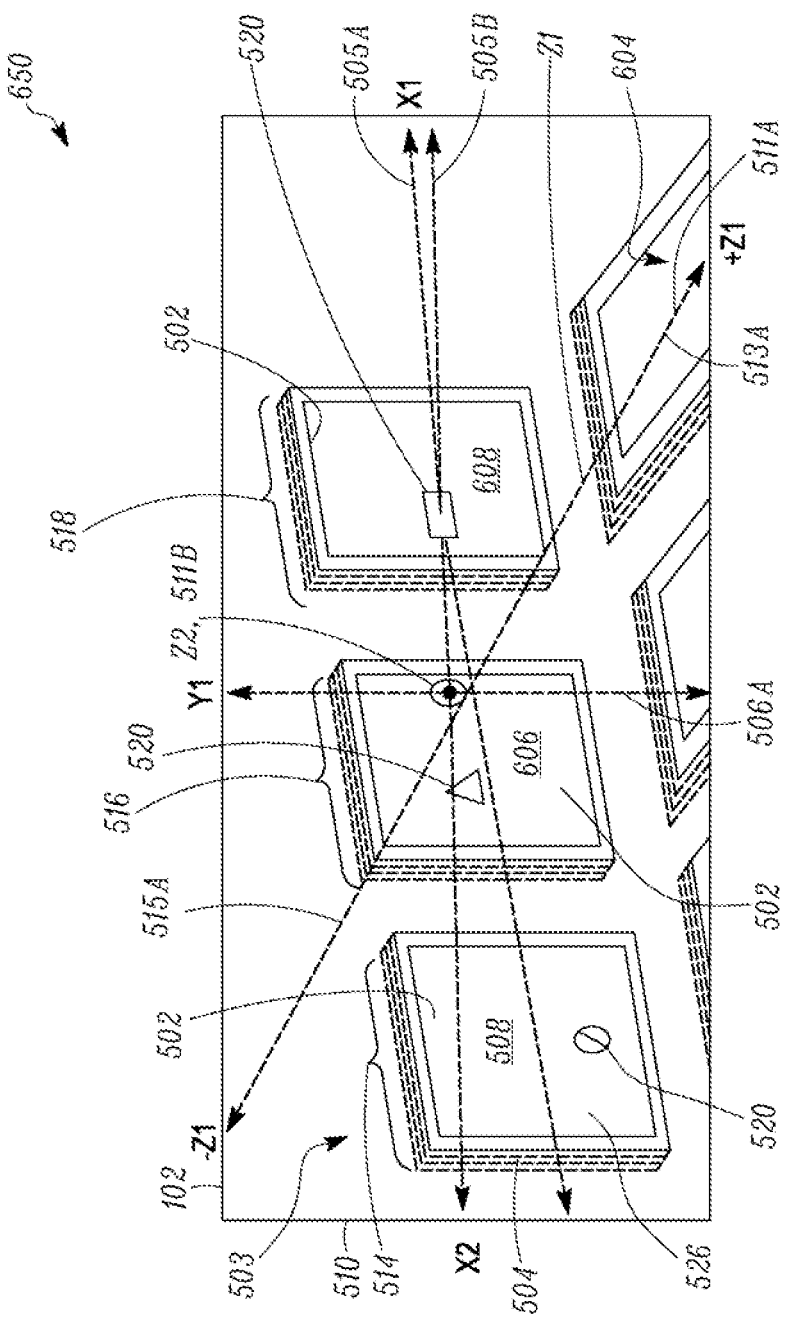
FIG. 6 is a further example of a browsing folder view illustrating the object images of FIG. 5.

As seen in FIG. 6, gradient reflections 604 of each object group 514, 516, and 518 can be provided to further enhance the stereoscopic effect seen by the user 416. The reflections 604 are shown positioned below the object groups 503 and appear faint relative to the object groups 503. Although the reflections 604 are only shown in FIG. 6, the reflections 604 can be provided in the folder view 550 as well as other views. In at least some embodiments, the reflections 604 are provided in all views.

Figure 7:
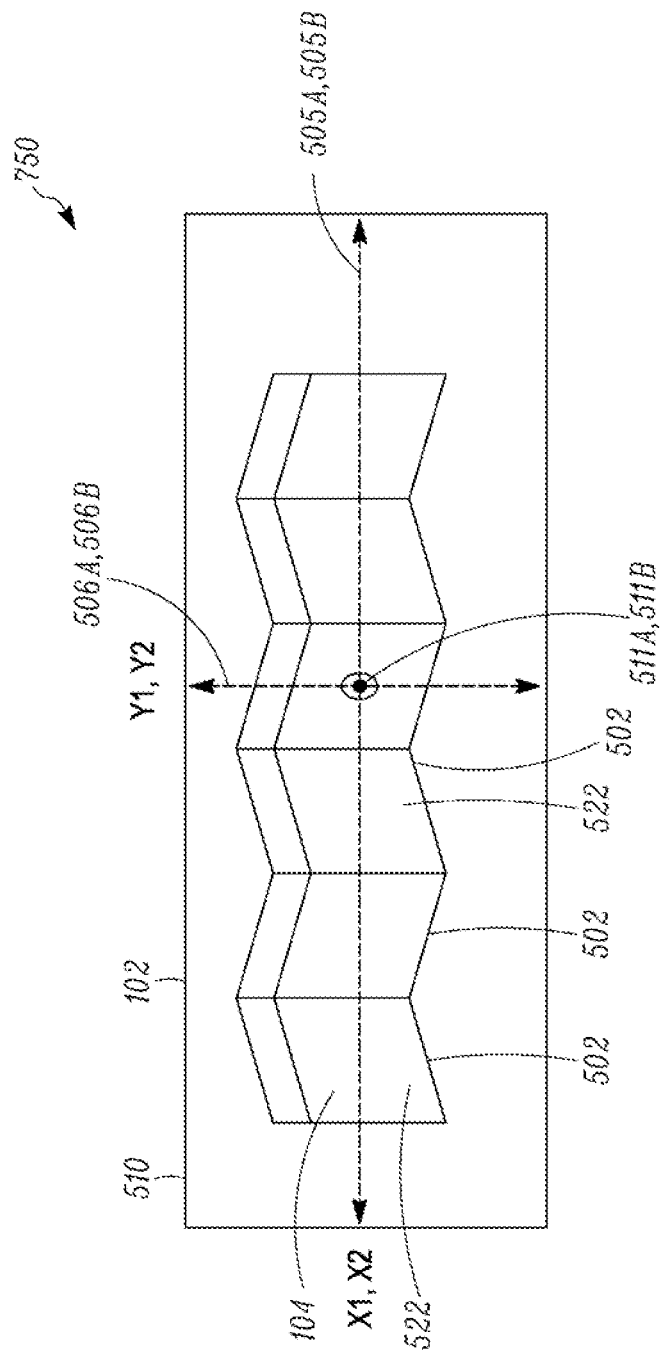
FIG. 7 is an additional example of a gallery view illustrating the object images of FIGS. 5 and 6.

Referring again to FIG. 5, the selection of a different object stack 504 in the folder view 550, such as group-C 518 (the "All Photos" group), can generate yet another view, such as the gallery view 750 shown in FIG. 7. The gallery view 750 can provide another display view that enables a user to view a row of object images 502 without placing other object images 502 behind them. In the gallery view 750, the world coordinate system 501 and the camera coordinate system 509 can be coincident. The object images 502 are displayed in an oscillating accordion-style display arrangement. To provide a stereoscopic effect as seen by the user 416, portions of each of the object images 502 can be situated along the −Z1 axis 515A and +Z1 axis 513A, while other portions can be displayed at Z1=0. To provide selectability of all the object images 502, each of the object images 502 are situated at least partially at the zero-plane 510. With this display configuration, although viewed as stereoscopic, a user can easily select any object image 502, without folding down or shifting object images 502. Similar to the above example, the object images 502 can be swiped left and right to view additional object images 502 that do not fit on the display screen 102.

Figure 8:
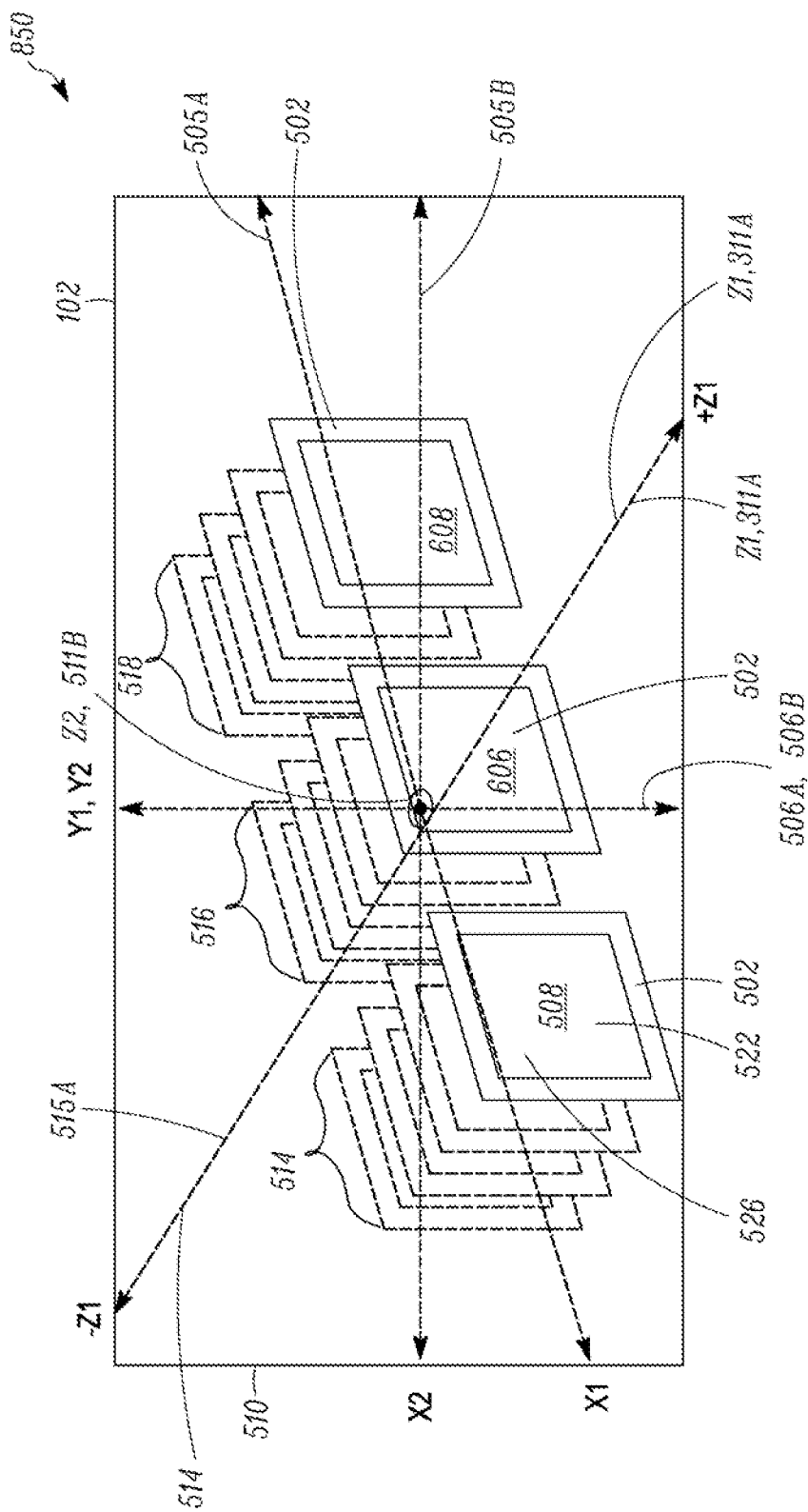
FIG. 8 depicts an example first browsing view illustrating the object images of FIGS. 5 and 6, with the object images being partly spaced apart from one another.

Returning to the browsing folder view 650 in FIG. 6, after the expiration of a time limit commenced after the browsing folder view 650 has been displayed, such as one second, the browsing folder view 650 can automatically shift to a first browsing view 802, as shown in FIG. 8. Alternatively or additionally, the user 416 can perform an action to switch to the first browsing view 802. As seen in FIG. 8, the first browsing view 802 is an expanded view of the browsing folder view 650. More particularly, the object groups 514, 516, 518 are not shown as compressed object stacks, but as expanded rows of object images 502, with each object image 502 spaced apart from the other object images 502 of their respective group. In this regard, the first browsing view 802 can provide a view with an expansive stereoscopic effect to the user.

The top object 508, 606, 608 of each object group 514, 516, 518 includes a graphical representation (not shown for clarity purposes). In addition, other object images 302 in one or more of the object groups 514, 516, 518 can include a graphical representation to provide the user 416 with some indication where a particular folder item may reside. Similar to FIG. 6, the top objects 508, 606, 608 are positioned along the X1 axis 505A, and with the object images 502 in the displayed position in the camera coordinate system 509 (angled with respect to the zero-plane 510), the object images 502, such as top object 508, are positioned about the zero-plane 510 and therefore can be designated the selectable object 526. The object images 502 not at the zero-plane 510 are positioned along either the −Z2 axis portion 515B (extends into the page) or the +Z2 axis portion 513B (extends out of the page). The selectable object 526 can be changed to another object image 502, as described above, by using a swiping gesture to the left or right to move each of the object groups 514, 516, 518 to the left or right. Alternatively and/or additionally, the selectable object 526 can be changed by changing the position of the object images 502 in the world coordinate system 501 (such as folding an object image 502 forward). Once the desired selectable object 526 has been positioned appropriately to allow its selection, the user 416 can select it by touch to view the associated media (e.g., photograph) in a larger format.

Figure 9:
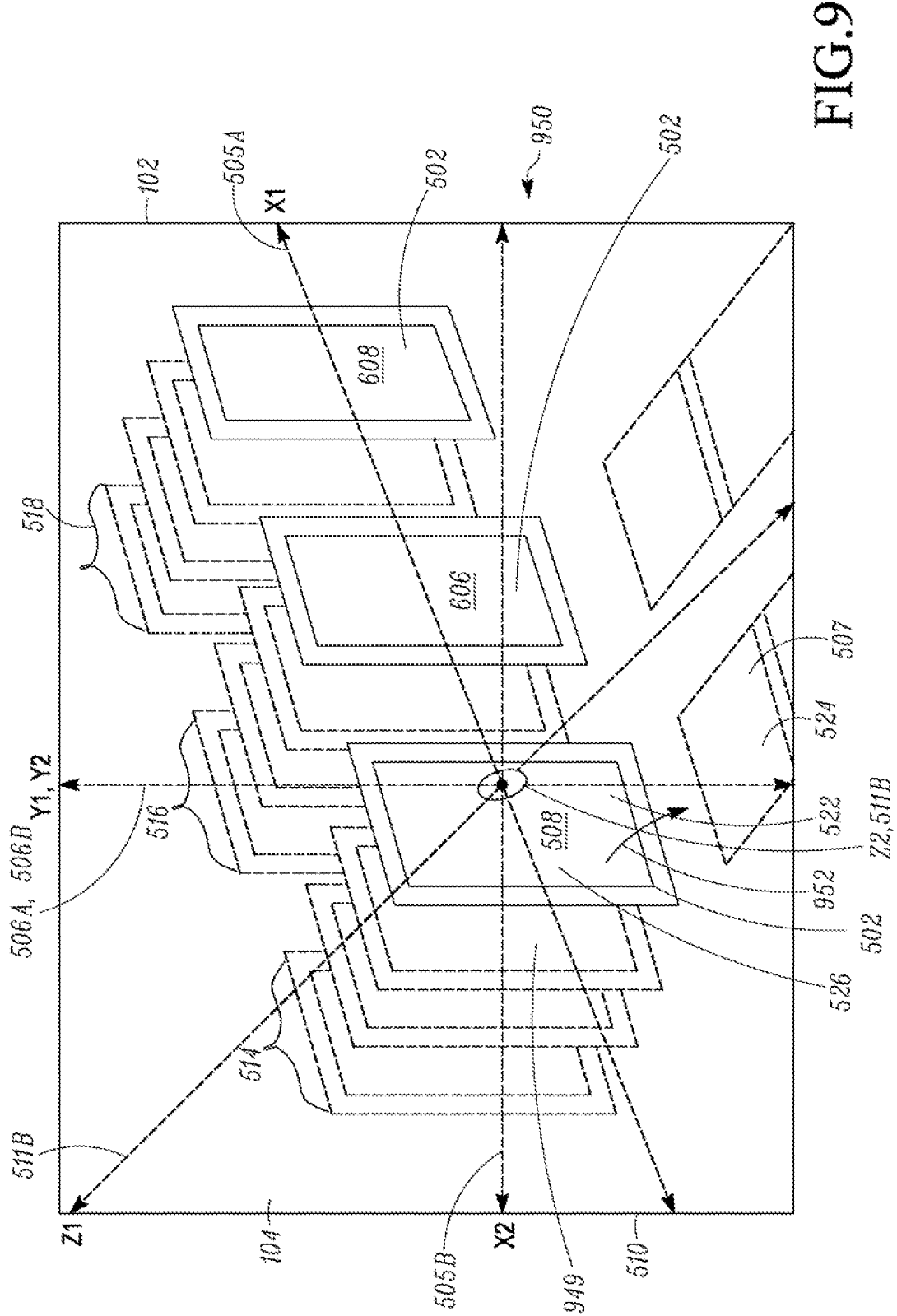
FIG. 9 depicts an example second browsing view illustrating at least some of the object images of FIG. 8 subsequent to certain user interaction having taken place.

As seen in FIG. 9 in a second browser view 950, if the user 416 wants to view an object image 502 that is displayed behind a selectable object 526, then the user can touch the selectable object 526 and perform a gesture, such as a downward drag motion, as represented by an arrow 952. The touch and drag motion folds the top object 508 down on an object front face 522 (forming the folded object 507), thereby exposing an object rear face 524 of the selectable object 526. As discussed above, the object rear face 524 can include graphical representations and/or text describing the details of the object it represents, such as a file creation date.

Figure 10:
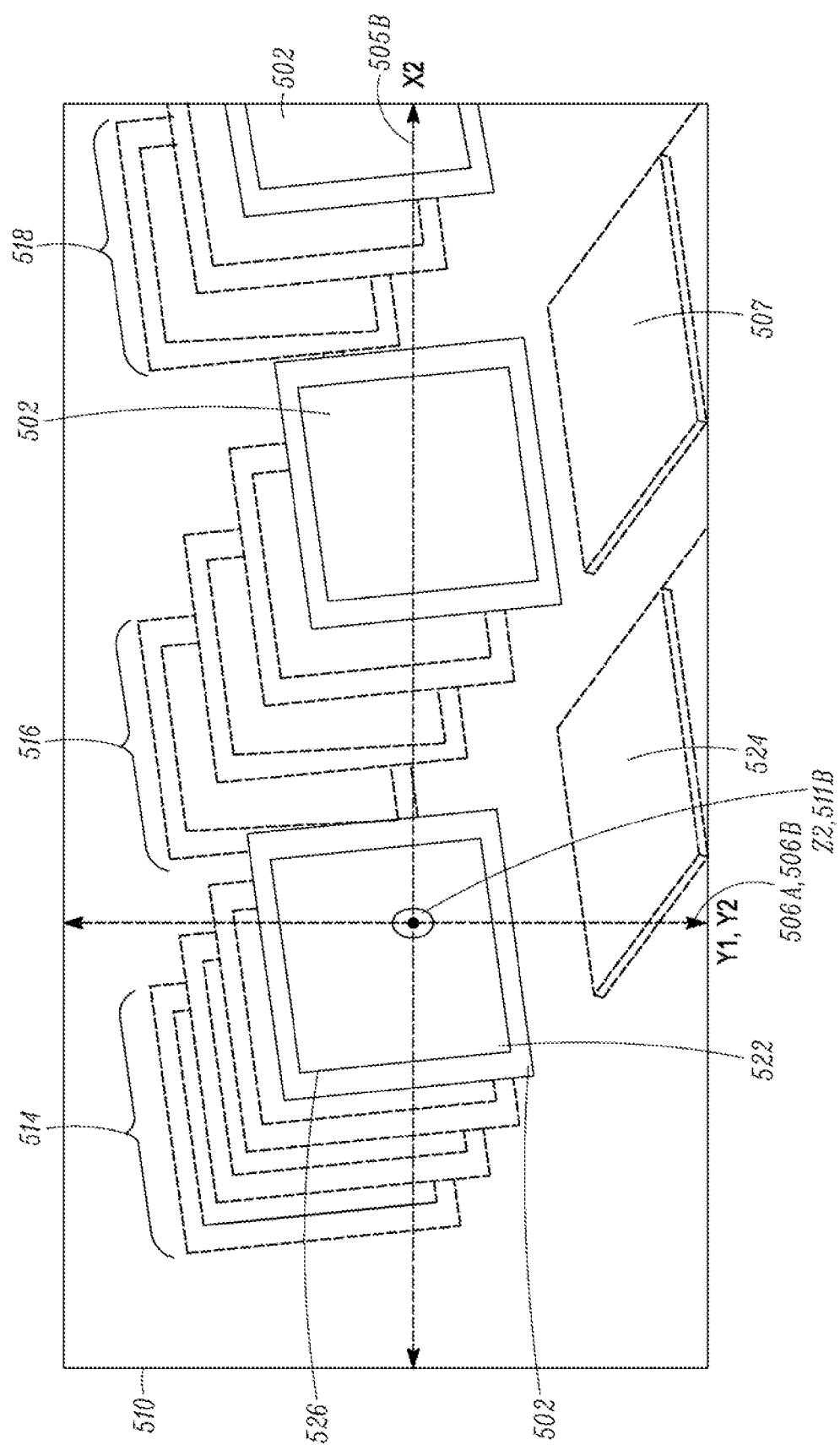
FIG. 10 depicts an example rotated and zoomed view of at least some of the object images of FIG. 9.

FIG. 9 is further intended to show the selectable object 526 (top object 508) both before and after a folding gesture has been performed as designated by arrow 952. More particularly, the object front face 522 of the top image 508 is removed from view and the object rear face 524 is exposed. Referencing the selectable object 526 as the now folded object 507, the folded object 507 is now positioned along the +Z1 axis portion 313A and +Z2 axis portion 313B (extending out from the page), which serves to enhance the stereoscopic effect by providing the illusion that the folded object 507 is positioned outward of the display screen 102 and therefore, closer to the user 416 than non-folded object image 502. It should be appreciated that, once the selectable object 526 has been folded down, a back object image 949 shown behind it in FIG. 9 is fully revealed and becomes the new top object 508 and selectable object 526. During or after the selectable object 526 has been folded down, the object images 502 in the object group 514 can be shifted forward along one or both of the Z1 axis 511A and Z2 axis 511B so as to appear closer to the user 416. Further, additional folded object images 507 (as shown in FIG. 10) can be displayed in front of other object groups 516, 518. This can be accomplished through the selection of object images 502 from object groups 516, 518 in a prior action.

As discussed, object images 502 can be folded down to reveal additional object images 502. Similarly, the object images 502 can also be folded up from the folded down position to replace the top object 508, which in at least some embodiments is followed by a shift backwards of the object images 502 in the object group 514 along one or both of the Z1 axis 511A and Z2 axis 511B so as to appear farther from the user 416.

In at least some embodiments, it can be desirable for the user 416 to access an object image 502 that is positioned substantially behind the top object 508 in the object group 514, or located in another object group (e.g., object groups 516, 518). To provide a convenient method of access for the user 416, the object images 502 can be shifted in the camera coordinate system 509 to bring an object image 502 to the zero-plane 510. Once at the zero-plane 510, the object image 502 becomes the selectable object image 126. To bring such an object image 502 to the zero-plane 510, the user 416 can perform a specific gesture at or about the display screen 102, which is sensed by the processor portion 204. The gesture can include one of a variety of actions, such as a point selection, wherein the user 416 holds their finger on the display screen 102 over the object image 502 they wish to move into the top object 508 position (selectable object 526). The touching of the display screen 102 can continue for a duration greater than a touch selection, wherein the touch selection utilizes a momentary touching of the screen (e.g., tap). Utilizing this point selection method provides convenient access to an object image 502 without having to select (fold down) numerous object images 502 in an object group 503, or to have to switch between object groups 503 to gain access to a different set of object images 502.

Due to the nature of the stereoscopic presentation of the object images 502 and the proximity of the object images 502 with each other, during a point selection an indicator can be provided to assist with identifying where the user 416 is pointing to. For example, the object image 502 that is sensed by the mobile device 100 to be closest to the point on the display screen 102 that the user 416 is touching can be highlighted to provide selection feedback to the user 416. In addition to selecting a single object image 502, the point selection method can further be utilized to select any object group 514, 516, 518, or to bring a particular range of object images 502 to the forefront without having to select and fold down several object images 502.

Figure 11:
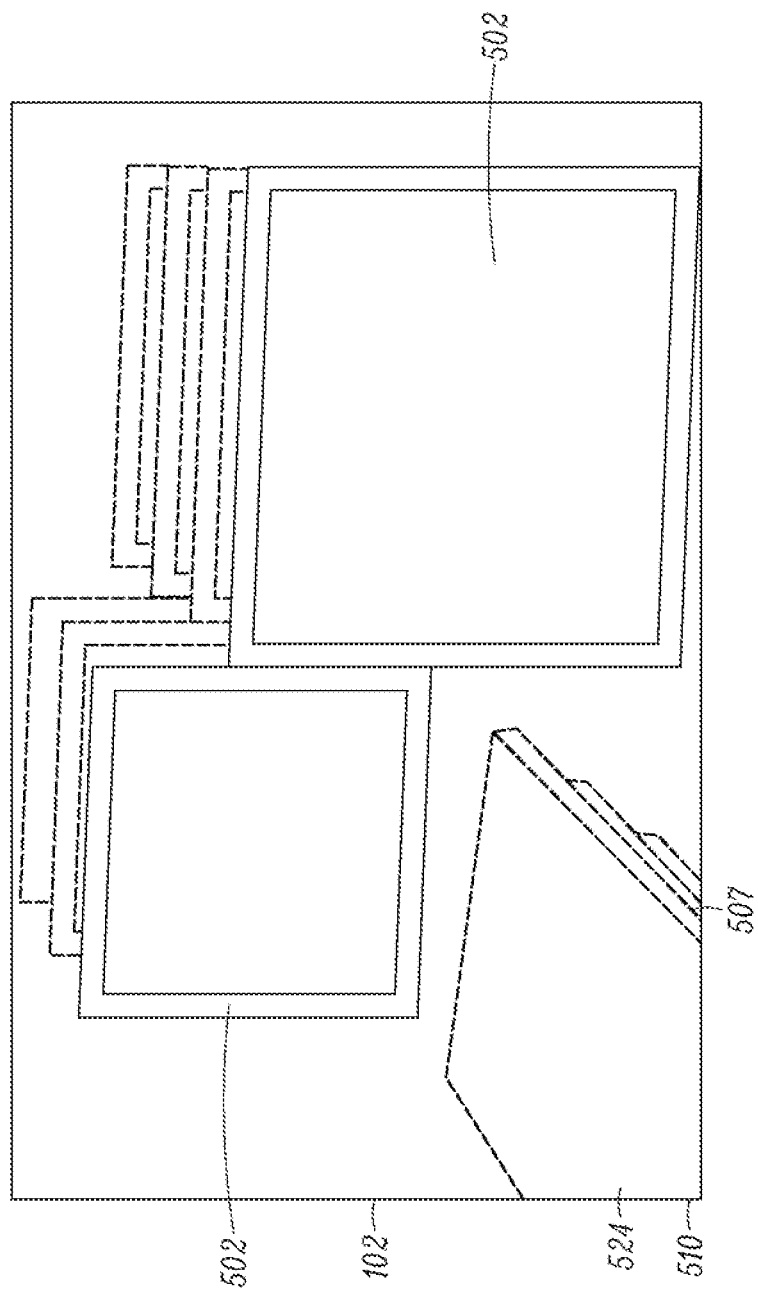
FIG. 11 depicts an example rotated and zoomed view of at least some of the object images of FIG. 10.

As further shown in FIG. 9, the object images 502 in a particular object group, such as object group 514, can be displayed in a different orientation with respect to the other object groups 516, 518, such as tilted backwards a few degrees to better differentiate the object group 514 from the other object groups 516, 518. In addition, as discussed above, the user's view of the object images 502 in their current world coordinate system 501 positions can be changed by moving the object images 502 in the camera coordinate system 509. To accomplish this, the user 416 can perform a gesture, such as a double-tap on the display screen 102, which can signal the processor portion 204 to unlock the position of the object image 502 in the camera coordinate system 509. Once unlocked, the position of the object images 502 can be changed by a gesture, such as a movement of a user's touch across the display screen 102 (e.g., swiping). As shown in FIG. 10, the position of the object images 502 in the camera coordinate system 509 has been shifted relative to the view in FIG. 9. When the user 416 performs a view change in this manner, the coordinates of the object images 502 in the world coordinate system 501 remain unchanged. In addition to a rotational view change, the object images 502 can be brought closer or further from the display screen 102 using a zoom gesture. As seen in FIG. 10, the object images 502 have been rotated and zoomed, which can be used to provide a better view of an object image. FIG. 11 depicts the object images 502 of FIG. 9 further rotated and zoomed beyond their positions shown in FIG. 10.

It should be noted that prior to, during, or after a view is presented, interaction hints (e.g., text) can be displayed to assist the user by providing specific options and/or instructions for their implementation. In addition, the views provided in the Figures are example and can vary to accommodate various types of media as well as various types of mobile devices. Further, the order of display of the views can be modified and include additional views. Many of the selections described herein can be user selectable only and/or time based for automated actuation.

In view of the many possible embodiments to which the principles of the method and system encompassed herein may be applied, it should be recognized that the embodiments described herein with respect to the drawing Figures are meant to be illustrative only and should not be taken as limiting the scope of the method and system encompassed herein. Therefore, the method and system encompassed herein contemplates all such embodiments as may come within the scope of the following claims and equivalents thereof.

We claim:

1. A method of interactive display comprising:
providing a touch-based display screen capable of displaying perceived three-dimensional (3D) object images;
displaying a plurality of object images on the display, wherein at least a first of the object images is selectable and displayed so as to appear to be located at least partially in a zero-plane of the touch screen, wherein at least a second of the object images is displayed so as to appear to be located at least one of inwardly and outwardly of the zero-plane;

rotating a view of the plurality of object images as a group in a camera coordinate system on the display while maintaining the apparent distance between each of the plurality of object images, wherein the rotating shifts at least one of the object images either inward or outward of the zero plane to allow selection of one or more object images that are shifted to the zero plane;

receiving a first input at a location of the display screen substantially corresponding to the first of the object images; and identifying the first input as corresponding to the first object image that is selectable and taking at least one further action upon the identification.

2. The method of claim 1, wherein the at least one further action includes displaying the first of the object images or a modified version of the first of the object images on the touch screen so as to appear to be located outwardly of the zero-plane.

3. The method of claim 1, further including modifying the display of the second of the object images to appear to be located at least partially in the zero-plane of the touch display, after the first of the object images or a modified version of the first of the object images is displayed so as to appear to be located outwardly of the zero-plane.

4. The method of claim 3, further including modifying the displaying on the touch screen so that the second of the object images or a modified version of the second of the object images is displayed so as to appear to be located outwardly of the zero-plane.

5. The method of claim 4, further including modifying the display of a third of the object images to appear to be located at least partially in the zero-plane of the touch display, after the second of the object images or a modified version of the second of the object images is displayed so as to appear to be located outwardly of the zero-plane.

6. The method of claim 1, further zooming the view of the plurality of object images on the display while maintaining the apparent distance between each of the plurality of object images.

7. The method of claim 1, wherein the plurality of object images are displayed in an array.

8. A method of interactive display comprising:

displaying a plurality of object images on a touch sensitive display screen of a mobile device, wherein the plurality of object images are arranged into at least a first object group and a second object group;

displaying the first and second object groups as first and second object stacks situated substantially side by side, wherein a first object image of the plurality of object images is displayed on the first object stack as a first top object with a first object front face exposed, and wherein the first top object is positioned to appear at least partially at a zero-plane, and wherein a second object image of the plurality of object images is displayed on the second object stack as a second top object with a second object front face exposed, and wherein the second top object is positioned to appear at least partially at the zero-plane;

selecting any of the plurality of object images displayed, except the first top object, wherein upon selection, the plurality of object images is shifted with respect to the zero-plane to position the current selected object image at least partially at the zero-plane, and shifting the remaining object images either inward or outward of the zero-plane;

selecting one of the first top object and the second top object and modifying the display of the first object stack and second object stack to position the selected top object at least partially at the zero-plane; and modifying the display of the unselected top object to position the unselected top object inward of the zero-plane.

9. The method of claim 8, further including displaying an image of a gradient reflection of at least a portion of the object stacks at a position that is adjacent to a bottom portion of the object stacks.

10. The method of claim 8, further including modifying the appearance of each of the first and second object stacks to appear as rows of object images.

11. The method of claim 8, further including modifying the appearance of the first top object of the first object stack to be displayed in a folded object position, so that the first top object or a modified version of the first top object is displayed so as to appear to be located substantially outwardly of the zero-plane.

12. The method of claim 11, wherein a first rear object face of the first top object is displayed when the first top object is placed in a folded object position and the first front object face is removed from view.

13. The method of claim 11, further including modifying the appearance of the first object stack to shift the object images in the first object stack in an outwardly direction, such that a first back object image that was previously positioned inward of the zero-plane and directly behind the first top object prior to folding, is displayed in the former position of the first top object prior to its folding, wherein at least a portion of the first back object image appears at least partially within the zero-plane upon assuming the former position of the first top object.

14. The method of claim 13, further including modifying the position of the object image situated in the folded object position to appear unfolded with its front object face exposed and positioned at least partially at the zero-plane.

15. The method of claim 10, further including rotating a displayed view of the first and second object stacks to display an alternate view of the first and second object stacks without modifying the spatial distance between the plurality of object images in the first and second object stacks, wherein rotation of the first and second object stacks shifts the first top object either inward or outward of the zero-plane.

16. The method of claim 8, wherein each object image of the plurality of object images is associated with an object that is at least one of stored on and accessible by the mobile device.

17. The method of claim 16, further comprising displaying the associated object on the display screen upon selection of a corresponding object image.

18. The method of claim 8, wherein each object image of the plurality of object images includes at least one of a graphical and textual representation to identify the associated object.

19. A mobile device comprising:

a touch sensitive display screen capable of providing a perceived three-dimensional (3D) view, wherein the perceived three-dimensional (3D) view includes an image displayed on the display screen that includes a plurality of object images, wherein the object images appear to a viewer of the display screen to be situated in a three-dimensional virtual space that includes an X axis, Y axis, and Z axis with the virtual space being intersected by a zero-plane located at the surface of the display;

wherein at least one of the object images is displayed so as to appear at least partly coincident with the zero-plane, such that it is selectable by a user for performing a function, and at least one of the other object images is positioned at least one of inward and outward of the zero-plane and is not selectable to perform a function;

and wherein selection by a user shifts the at least one of the object images that is selectable out of the zero-plane and modifies an appearance of the at least one of the object images so as to be displayed in a folded object position; and a processor that is programmed to control the display of the object images on the display screen.

* * * * *